(12) United States Patent
Martone

(10) Patent No.: US 6,285,720 B1
(45) Date of Patent: Sep. 4, 2001

(54) METHOD AND APPARATUS FOR HIGH DATA RATE WIRELESS COMMUNICATIONS OVER WAVEFIELD SPACES

(75) Inventor: Massimiliano Max Martone, Gaithersburg, MD (US)

(73) Assignee: W J Communications, Inc., Milpitas, CA (US)

( * ) Notice: Subject to any disclaimer, the term of this patent is extended or adjusted under 35 U.S.C. 154(b) by 0 days.

(21) Appl. No.: 09/378,337

(22) Filed: Aug. 20, 1999

Related U.S. Application Data
(60) Provisional application No. 60/136,699, filed on May 28, 1999.

(51) Int. Cl.$^7$ .................................................... H04L 5/12
(52) U.S. Cl. ...................... 375/262; 375/219; 375/267; 455/101
(58) Field of Search .................................. 375/262, 264, 375/267, 219, 347; 455/102, 101, 132

(56) References Cited

U.S. PATENT DOCUMENTS

| | | | |
|---|---|---|---|
| 5,305,353 | * | 4/1994 | Weerackody .......................... 375/347 |
| 5,592,490 | * | 1/1997 | Barrat et al. .......................... 370/310 |
| 5,960,039 | * | 9/1999 | Martin et al. .......................... 375/267 |
| 6,058,105 | * | 5/2000 | Hochwald et al. .................... 370/310 |
| 6,088,408 | * | 7/2000 | Calderbank et al. ................. 375/347 |

OTHER PUBLICATIONS

Forney, G. D., "Maximum–Likelihood Sequence Estimation of Digital Sequences in the Presence of Intersymbol Interference", *IEEE Transactions on Information Theory*, vol. IT–18, No. 3, May 1972, pp. 363–378.

Rioul, O., "A Discrete–Time Multiresolution Theory", *IEEE Transactions on Signal Processing*, vol. 41, No. 8, Aug. 1993, pp. 2591–2606.

Zhang et al., "A Wavelet–Based KL–Like Expansion for Wide–Sense Stationary Random Processes", *IEEE Transactions on Signal Processing*, vol. 42, No. 7, Jul. 1994, pp. 1737–1745.

(List continued on next page.)

*Primary Examiner*—Temesghen Ghebretinsae
(74) *Attorney, Agent, or Firm*—Flehr Hohbach Test Albritton & Herbert LLP

(57) ABSTRACT

The invention relates to a method and apparatus for digital communications that provides high data rate wireless connections with bandwidth efficiency. The creation of multiple channels (that share the same time-frequency region) between the transmitter and the receiver is achieved by sampling the wavefield space with respect to the spatial domain. The wavefield space is the space spanned by the channel parameters that characterize the multipath fading environment. At the transmitter, symbols are simultaneously modulated and transmitted using signals that occupy the same frequency portion of the spectrum, but are distinguishable because different is their position in the wavefield space. The received signals are optimally processed to extract the digital information. The optimum demodulator estimates the wavefield space parameters without any training sequence or signal and performs optimum separation of the different signals to obtain the multiple streams. The throughput of such communication system is an integer multiple of the throughput that is achievable at each different position in the wavefield space. Given a perfect estimate of the wavefield space parameters, the Maximum Likelihood principle is the optimum strategy for detection. When the wavefield space parameters are a-priori unknown, the Maximum Likelihood detector can not be implemented. The invention describes the use of a focused wavelet-based model in the statistic of the detector which results in an effective approach to wavefield space demodulation without training signals or sequences in frequency selective multipath fading with arbitrarily time-varying fading characteristics.

22 Claims, 10 Drawing Sheets

OTHER PUBLICATIONS

Dijkerman et al., "Wavelet Representations of Stochastic Processes and Multiresolution Stochastic Models", *IEEE Transactions on Signal Processing,* vol. 42, No. 7, Jul. 1994, pp. 1640–1652.

Doroslovacki et al., "Wavelet–Based Linear System Modeling and Adaptive Filtering", *IEEE Transactions on Signal Processing,* vol. 44, No. 5, May 1996, pp. 1156–1167.

Strang et al., "Chapter 6–Multiresolution", *Wavelets and Filterbanks,* Wellesley–Cambridge Press, 1996, pp. 174–219.

Martone, M., "Cumulant–Based Adaptive Multichannel Filtering for Wireless Communication Systems with Multipath RF Propagation Using Antenna Arrays", *IEEE Transactions on Vehicular Technology,* vol. 47, No. 2, May 1998, pp. 377391.

Martone, M., "An Adaptive Algorithm for Antenna Array Low–Rank Processing in Cellular TDMA Base Stations", *IEEE Transactions on Communications,* vol. 46, No. 5, May 1998, pp. 627–643.

Martone, M., "On MMSE Real–Time Antenna Array Processing Using Fourth–Order Statistics in the U.S. Cellular TDMA System", *IEEE Journal on Selected Areas in Communications,* vol. 16, No. 8, Oct. 1998, pp. 1396–1410.

Giannakis et al., "Basis Expansion Models and Diversity Techniques for Blind Identification and Equalization of Time–Varying Channels", *Proceedings of the IEEE,* vol. 86, No. 10, Oct. 1998, pp. 1969–1986.

Strang et al., "Chapter 3–The Noble Identifies", *Wavelets and Filterbanks,* Wellesley–Cambridge Press, 1996, pp. 100–102.

Proakis, J.G., "Chapter 10–Communication Through Band–Limited Linear Filter Channels", *Digital Communications,* Third Edition, McGraw Hill, pp. 583–601.

* cited by examiner

METHOD AND APPARATUS FOR HIGH DATA RATE WIRELESS COMMUNICATIONS OVER WAVEFIELD SPACES

This application claims priority to Provisional Application No. 60/136,699, filed on May 28, 1999, incorporated herein by reference.

FIELD

The invention is directed to a method and apparatus for high data rate wireless communications over wavefield spaces. In particular, the invention provides a high data rate wireless communication between transceivers using a multi-dimensional technique.

BACKGROUND

The wireless communication industry is responding to consumer demand for high speed data services. The increased Radio Frequency (RF) spectrum acquisition costs associated with the achievement of throughputs that are comparable with wired communication technology has dramatically enhanced the interest in new methods to obtain spectrally efficient modulation formats. The technical challenge posed by these emerging requirements is residing in the intrinsic physical limitations of the wireless propagation environment. Noise, interference, severe multipath and time-varying characteristics of the fading channel contribute to make high-speed wireless data communications a difficult and challenging problem. Traditional communication engineering theory states that an increase in data rate is achieved by a combination of an increase in bandwidth occupation, an increase in radiated power at the transmitter, and an increase in dimensionality in the signal space (that is the order of the digital modulation). A greater description of the prior art and background is provided in Appendix 1 of Provisional Application No. 60/136,699, filed on May 28, 1999 incorporated herein by reference.

Conventional communication technology is depicted in FIGS. 1A–B. A communication network between transceiver A and transceiver B employs a two-dimensional communication protocol using time and frequency. The message to be communicated is broken into a plurality of smaller messages, or packets, that can be sent in the various time slots and frequency slots, according to the communication protocol. Since the receiver knows the communication protocol, it can reassemble the packets to replicate the original message. This type of communication protocol is well known in the art. A greater description of the prior art and background is provided in Appendix 1 of Provisional Application No. 60/136,699, filed on May 28, 1999 incorporated herein by reference.

What is needed is a communication system that provides high data rate communication in a wireless environment. The present invention analyzes practical methods to demodulate high data rate signals transmitted from different positions (antenna elements), that are afflicted by arbitrarily time-varying fading characteristics, with arbitrary time dispersion (frequency selective fading). This is of significant practical interest because in practice the fading environment can never be considered perfectly static even if transmitter and receiver are not in relative motion. The presented method and apparatus do not need training sequences or signals to estimate the channel: this gives additional advantage in terms of throughput with respect to prior art. The method and apparatus is implemented using available hardware for digital radio transceivers.

SUMMARY

The invention overcomes the conventional limitations and provides a high data rate wireless communication system between transceivers using a multi-dimensional technique. An exemplary embodiment of the invention for communicating information from one location to another through a wavefield space using a multi-dimensional communication protocol comprises a transmitter configured to receive a message and to encode a plurality of signals associated with the message. A first plurality of antennas is coupled to the transmitter and configured to transmit the plurality of signals associated with the message into the wavefield space. A second plurality of antennas is configured to receive the plurality of signals associated with the message. A receiver is coupled to the second plurality of antennas and configured to decode the plurality of signals associated with the message, wherein the receiver has no advance knowledge of at least one of the dimensions of the multi-dimensional protocol. The receiver reconstructs the message to retrieve the original information.

In one aspect of this embodiment, the multi-dimensional protocol is at least a three-dimensional protocol and the transmitter includes a plurality of transmit modules that each encode at least a portion of the message. The receiver includes a plurality of receiver modules that each decode complementary portions of the message to reconstruct the original information.

In another embodiment, the receiver is configured to execute a statistical procedure to identify and decode the plurality of signals. In one aspect of this embodiment, the receiver is configured to execute a Generalized Likelihood Detection (GLD) procedure to identify the plurality of signals and then execute a Maximum Likelihood Detection procedure (MLD) to decode the plurality of signals. In another aspect of this embodiment, the receiver is configured to estimate the wavefield space using a virtual wavefield space that approximates the wavefield space.

In yet another embodiment of a digital wireless transceiver, the transceiver comprises a digital circuit for detection of U number of different signals after radio frequency intermediate frequency downconversion comprised of digital baseband downconversion, trellis search processor, vector symbol synchronizer, wavefield estimator, wavefield gradient-based estimator, deinterlever, channel decoder and data extractor; and a digital circuit for detection of U number of different signals after radio frequency intermediate frequency downconversion able to cope with and exploit frequency selective multipath propagation, arbitrarily time-varying fading characteristics, non Line-Of-Sight communication.

Advantages of the invention include the ability to communicate high data rates from one location to another, where the data rates are in excess of those conventionally achievable.

DETAILED DESCRIPTION

The detailed description of the invention is organized in subsections where each subsection explains a topic that is fundamental to explain and justify the methods and associated apparatus. This description incorporates Appendix 1 of Provisional Application No. 60/136,699, filed on May 28, 1999 herein by reference.

A. Introduction

The present invention provides high data rate communication between a plurality of base stations where each base station transmits, using a plurality of antennas, into a multipath wavefield space. The signals are received by selected base station and resolved and decoded to recover the original transmitted information.

Figure 1A:
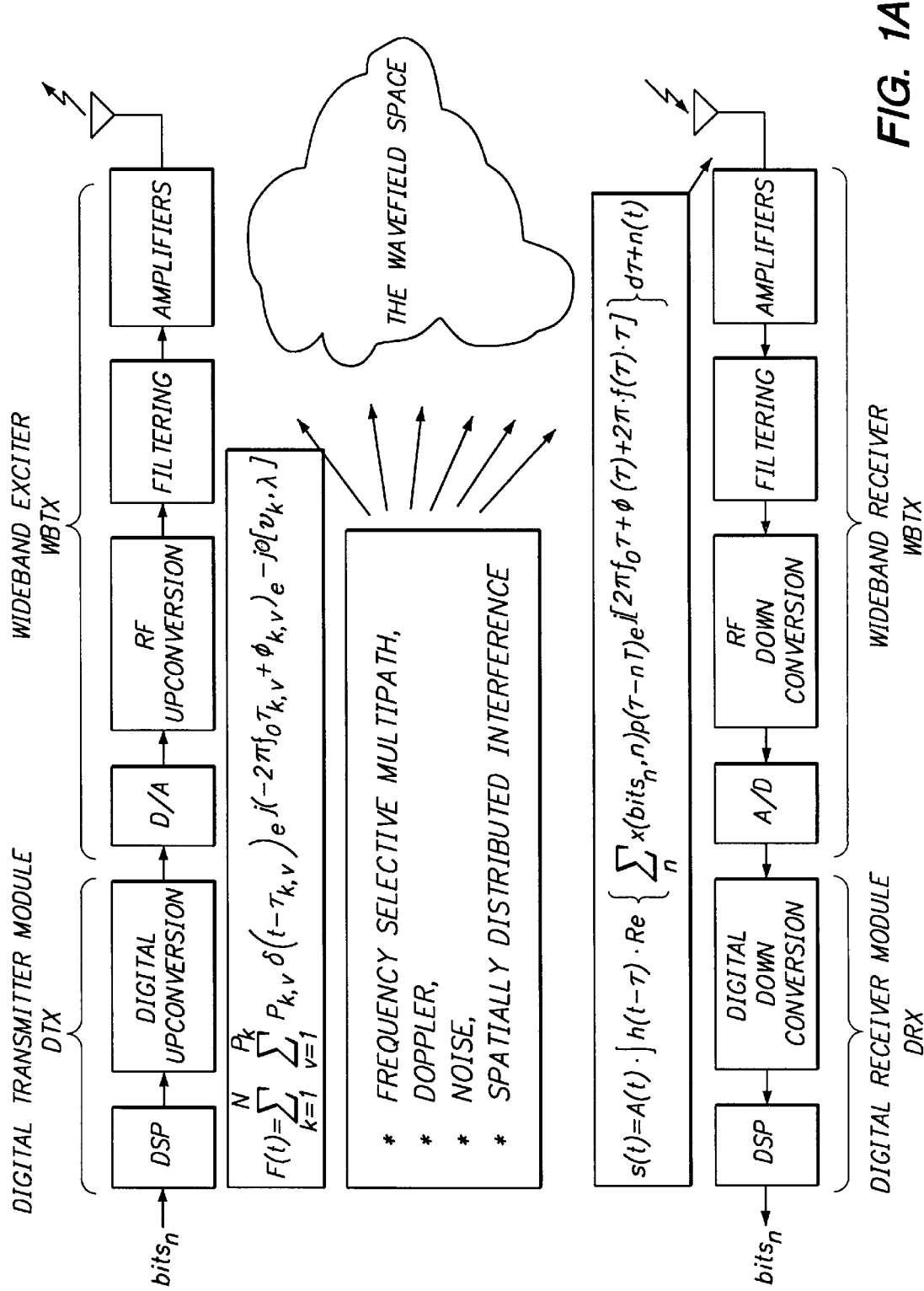
FIGS. 1A–B depict conventional communication technology according to the prior art.
Figure 1B:
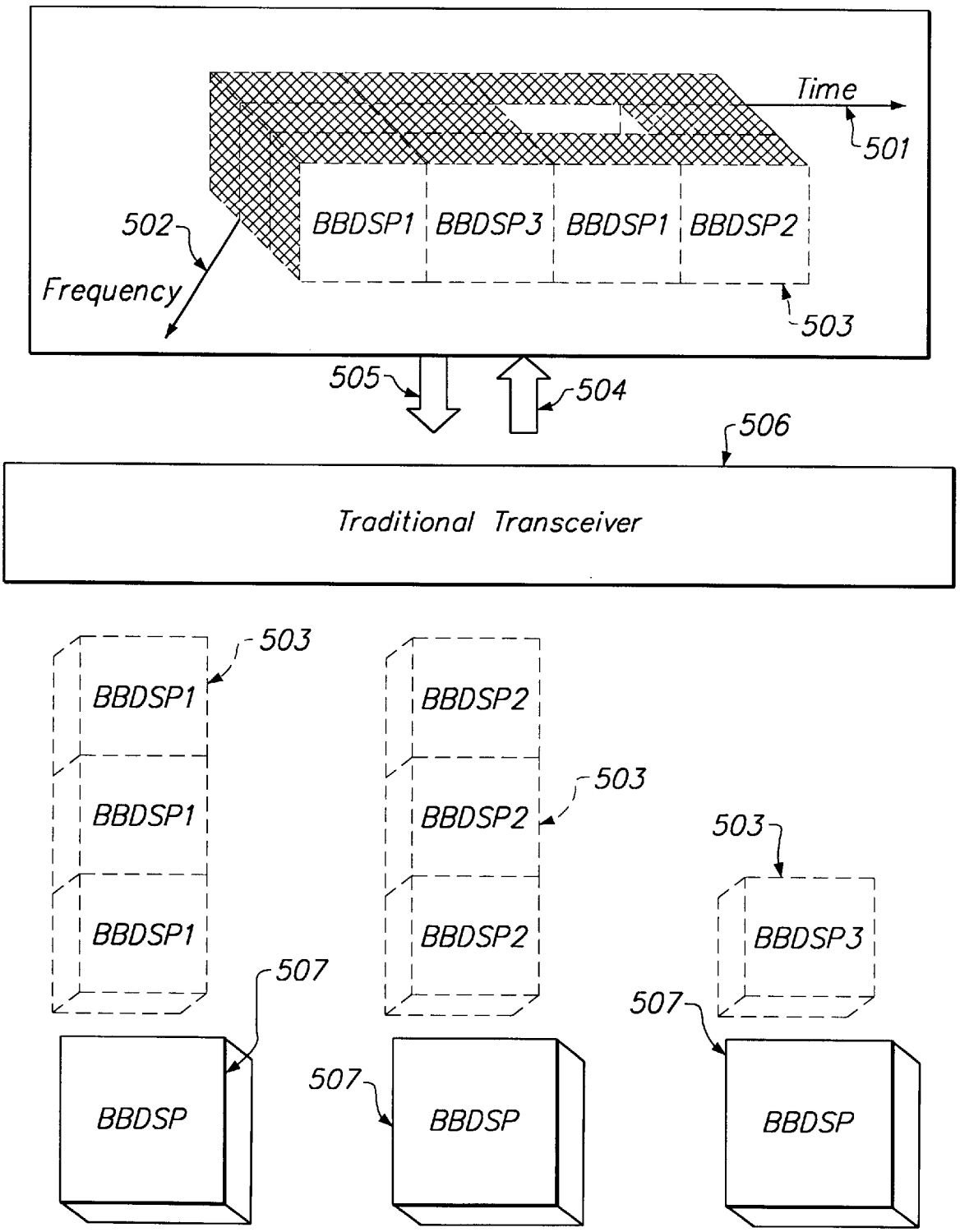
Figure 2A:
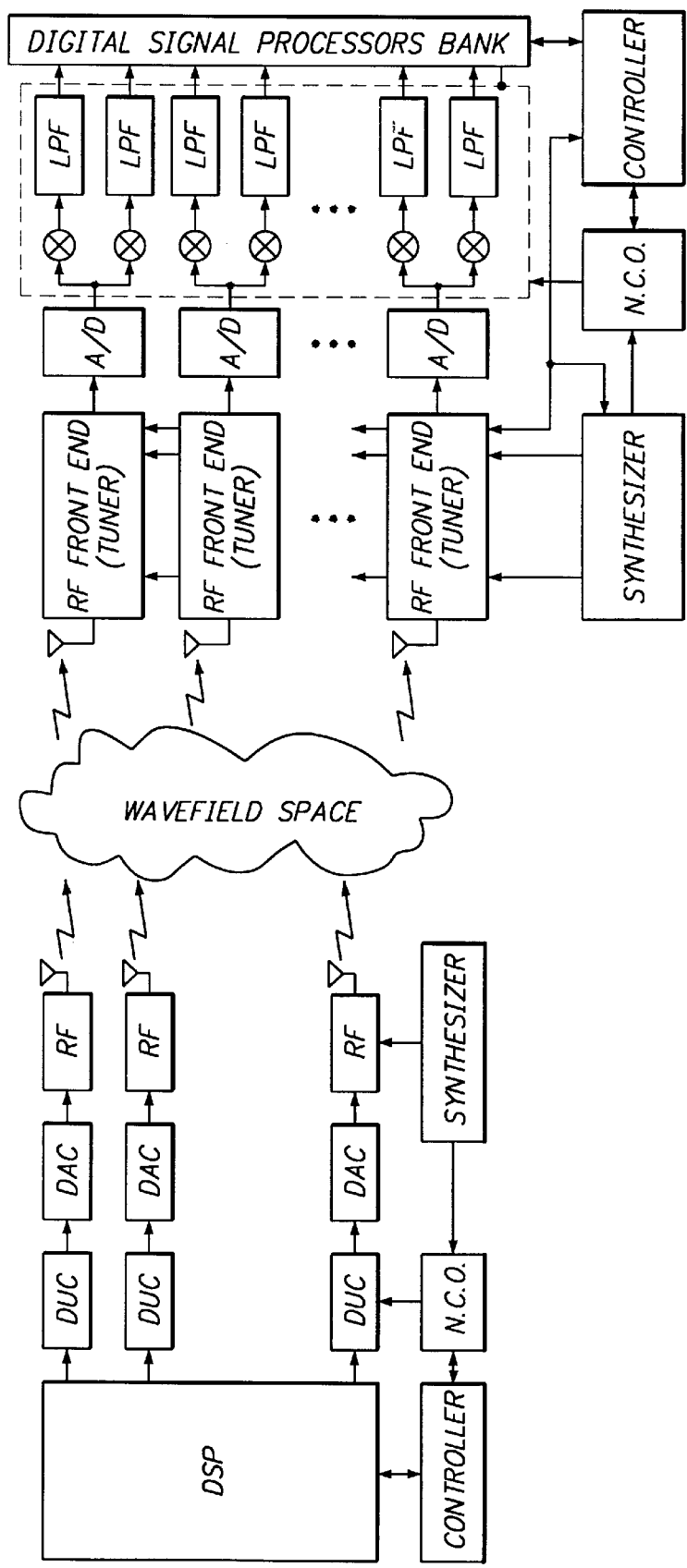
FIGS. 2A–B depict communication technology and a three-dimensional communication protocol according to an embodiment of the invention.
Figure 2B:
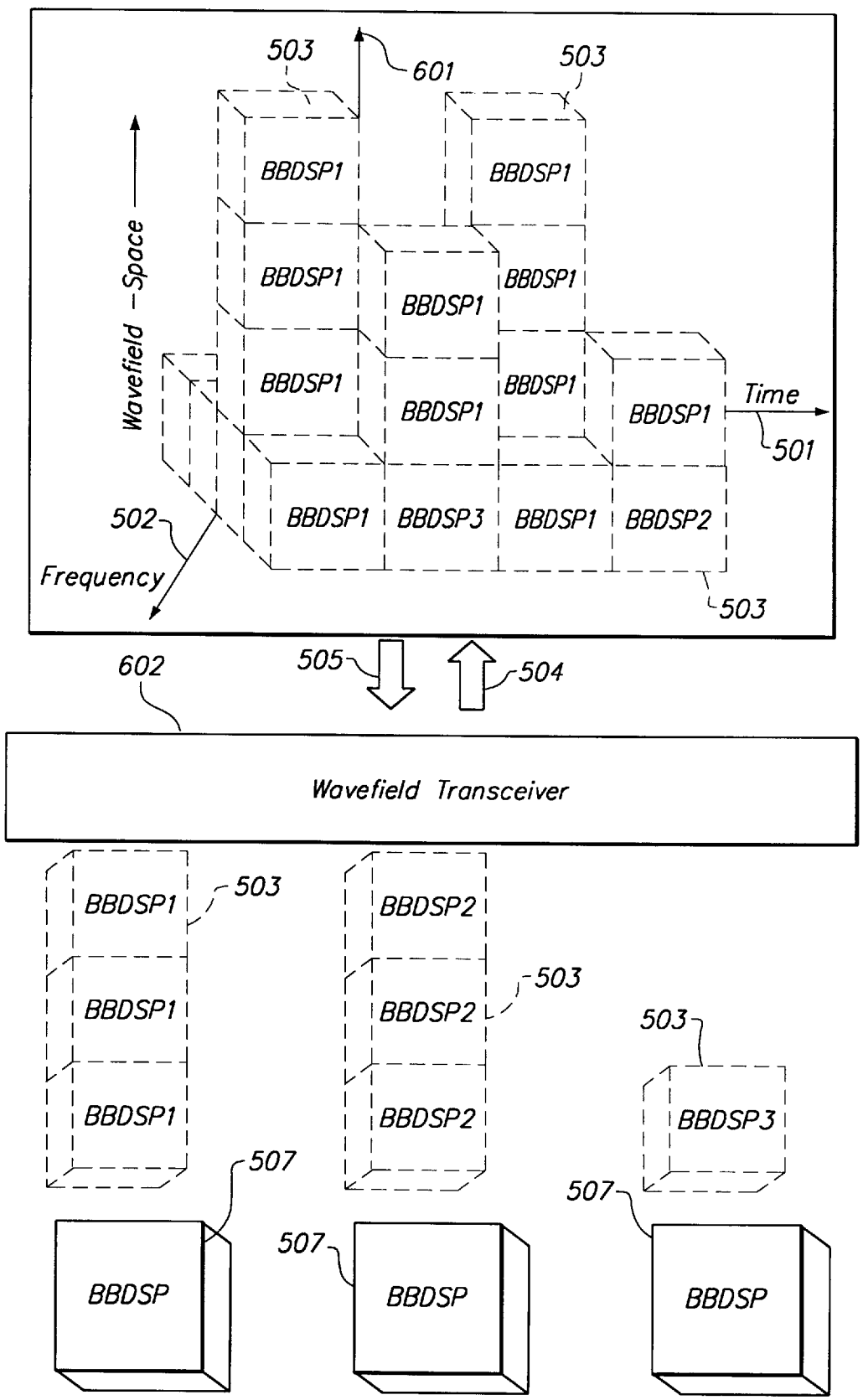

The wavefield space is the space spanned by the channel parameters that characterize the multipath fading environment. The communication involves sampling the wavefield space. Sampling the wavefield space creates a multi-link connection resource between the transmitter and the receiver. One aspect of the invention involves the spatial sampling of the wavefield space by antennas. As the transmitter symbols are modulated and simultaneously transmitted using signals that occupy the same frequency portion of the spectrum, they are distinguishable because of their different positions in the wavefield space. The shape of the wavefield space depends on the particular propagation environment. The optimum demodulator is a device that estimates the wavefield space parameters and performs optimum separation of the different signals to obtain the multiple streams. Evidently, the throughput of such a communication system is an integer multiple of the throughput that is achievable at each different position in the wavefield space. The concept of wavefield modulation can be better understood with reference to FIGS. 1 and 2, showing the transfer of digital information units from the baseband digital signal processing (DSP) domain to the Radio Frequency domain and vice versa. FIG. 1 depicts the conceptual operation performed by a traditional transceiver (that is a transmitter-receiver apparatus based on prior art). The baseband DSP processors 507 generate digital information units (packets) 503 in a non-synchronous fashion. The traditional transceiver 506 is responsible for modulating such digital information units (packets) 503 and allocate 504 each unit (packet) in a preassigned position in the time-frequency two-dimensional space: one point in the time-frequency plane corresponds to a signal that exist in a particular time instant given by the projection of the point onto the time axis 501 and with an instantaneous frequency given by the projection of the point onto the frequency axis 502. The traditional transceiver 506 is also responsible for demodulating such digital information units (packets) 503, extract 505 each unit (packet) from a preassigned position in the time-frequency two-dimensional space, and route the units 503 to the baseband DSP processors 507. The traditional transceivers are limited in throughput by the number of available slots in the time-frequency two-dimensional space since no two signals can occupy the same position in the space.

Figure 3:
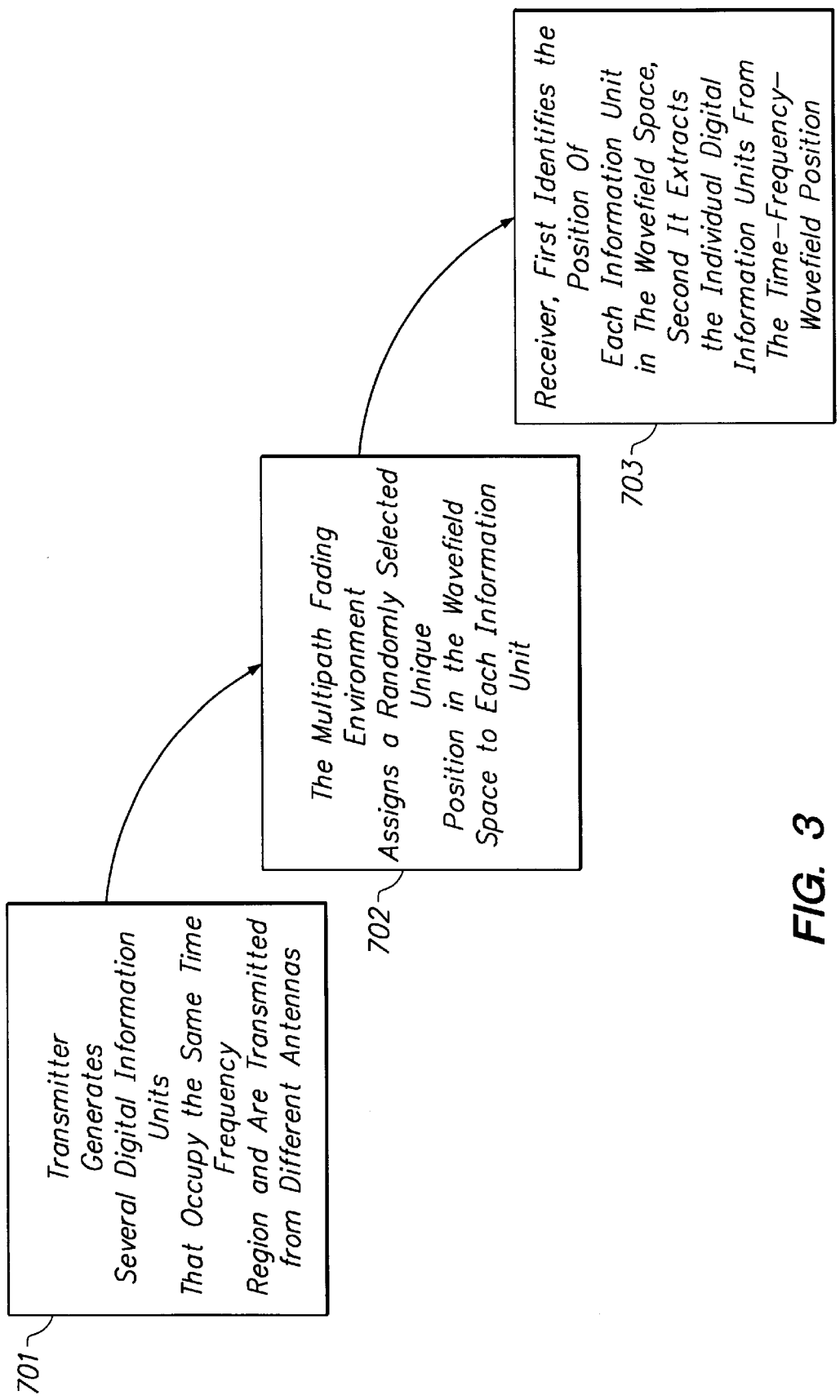
FIG. 3 is a flowchart depicting a sequence of events characterizing a communication protocol between two wavefield transceivers according to an embodiment of the invention.
Figure 6:
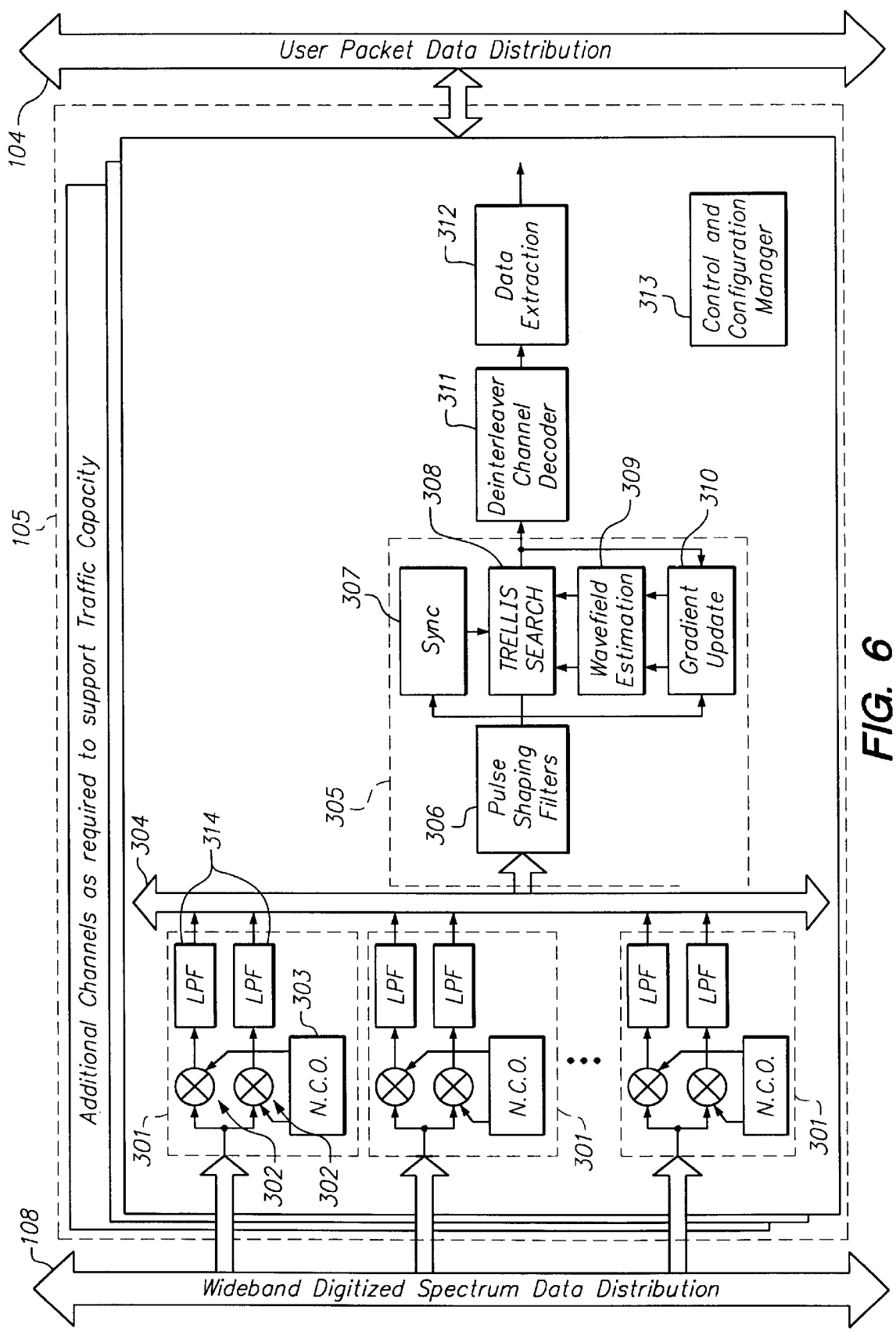
FIG. 6 illustrates in more detail the Digital Signal Processing section of the Receiver.

In contrast, the wavefield transceiver 506 shown in FIG. 6 is capable of much higher throughput given the same number of slots in the time-frequency two-dimensional space since, in fact, two signals can occupy the same position in the space. The basic mechanism that allows this is the fact that the wavefield transceiver 506 is capable of enabling the allocation of digital information units (packets) 503 in a third dimension 601, which is defined as the wavefield space. Basically, the throughput is now limited by a three-dimensional volume instead of the traditional two-dimensional volume. The wavefield transceiver 506 enables the allocation 504 (or extraction 505) of digital information units (packets) 503 in the wavefield space by transmitting (and receiving) from different points in space that exploits the multipath propagation environment for communicating across new dimensions. FIG. 3 describes the fundamental sequence of events 701, 702, 703 that characterize a communication session between two wavefield transceivers.

Given a perfect estimate of the wavefield space parameters, the Maximum Likelihood principle is the optimum strategy for detection. When the wavefield space parameters are not known in advance, the Maximum Likelihood detector can not be immediately implemented. A typical approach is the Generalized Likelihood Detector (GLD), which uses a Generalized Likelihood statistic (GLS) to detect the signals. The Generalized Likelihood statistic, derived for time-varying wavefield spaces, involves finding the orthogonal projection of the received signal onto the signal subspace; the transmitted signal (corresponding to one of the transmitted sequences of symbols) is known to lie in a subspace but its exact location is not known because the wavefield space parameters are unknown. Detectors in this class are also used in signal processing because their statistic is "matched" to the a-priori known signal subspace S. The (perfectly matched) orthogonal projection of the received signal onto the signal subspace S is difficult (if not impossible) to compute. To estimate the subspace S, the invention employs virtual subspaces, say V, that approximate the original signal subspace S in some sense, and whose orthogonal projections are more easily computed. These reduced-size signal subspaces V are obtained by a decomposition of the fading channel time variations using orthonormal wavelet bases.

The merits of the wavelet decomposition are to be reconducted to an outstanding localization capability in the time-frequency plane. Using expansions for a generic signal by means of orthonormal functions that are well-localized in the time-frequency plane implies that only a few coefficients of the expansion can be adopted to represent with extreme accuracy the original signal. Basically, the method and resulting apparatus use an efficient representation of the fading statistics in the maximum likelihood formulation of the detection problem.

In fact, the set of linear vector spaces defined by such decomposition provides also a nested sequence of subspaces that, at increasing level of detail, are "efficient" representations of the original signal subspace S. Part of the invention is a method to "focus" these (subspace) representations to the original signal subspace using the concept of Kolmogorov n width for signal classes. The use of the focused wavelet-based model in the statistic of the detector results in an effective approach to wavefield space demodulation.

B. Exemplary Transceiver

The basis for the present invention is communication between a plurality of base stations where each base station transmits, using a plurality of antennas, into a wavefield space. The signals are received by a selected base station and resolved and decoded to recover the transmitted information. The invention is performed by a base station structure similar to that described in U.S. Pat. No. 5,678,268, assigned to the same assignee as this application and incorporated herein by reference.

Figure 4:
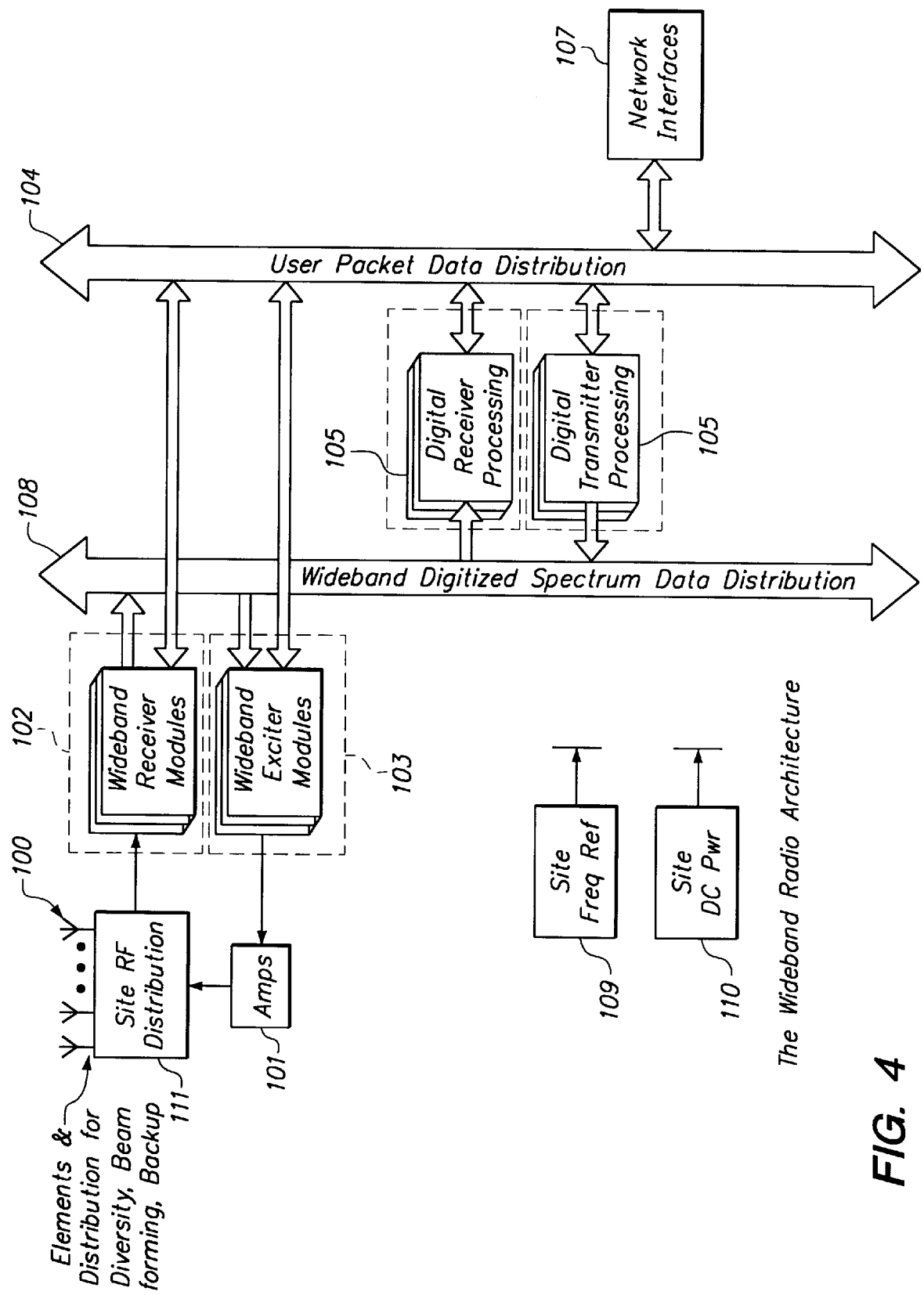
FIG. 4 illustrates the preferred embodiment of the invention in a transceiver (that is an apparatus for transmission and reception of digital information over the wavefield space)

Wideband Radios use a single Radio Frequency path to access the entire allocated band, performing traffic channelization via digital signal processing. Traditional radios perform traffic channelization in hardware and typically require an additional hardware combining network for multichannel systems. The flexibility increase inherent to wideband stems from the fact that the channelization process can be done in software or reconfigurable logic which can not only be upgraded but could be dynamically changed on a connection by connection basis as described in U.S. Pat. No. 5,678,268. FIG. 4 shows a Wideband architecture for a transceiver (that is an apparatus able to transmit and receive exploiting the wavefield modulation previously described). A plurality of receiving antennas 100 are connected to the site RF distribution 111 which is a network of RF signal distribution circuits. The Power Amplifiers 101 are necessary to amplify the transmit signal to reach the remote receiver at adequate distance. The Wideband Receiver Modules 102 (one per antenna) are in charge of filtering, amplifying, downconverting and digitizing the RF spectrum of interest. The digital samples at the output of the ADC from each of the Wideband Receiver Modules 102 are routed appropriately time-multiplexed to the Wideband Digitized Spectrum Data Distribution 108. Digital Receiver Processing modules 105 perform traffic channelization, demodulation and data extraction. On the transmit path the digital transmitter 106, the Wideband Exciter 103 perform the reverse operations.

Figure 5:
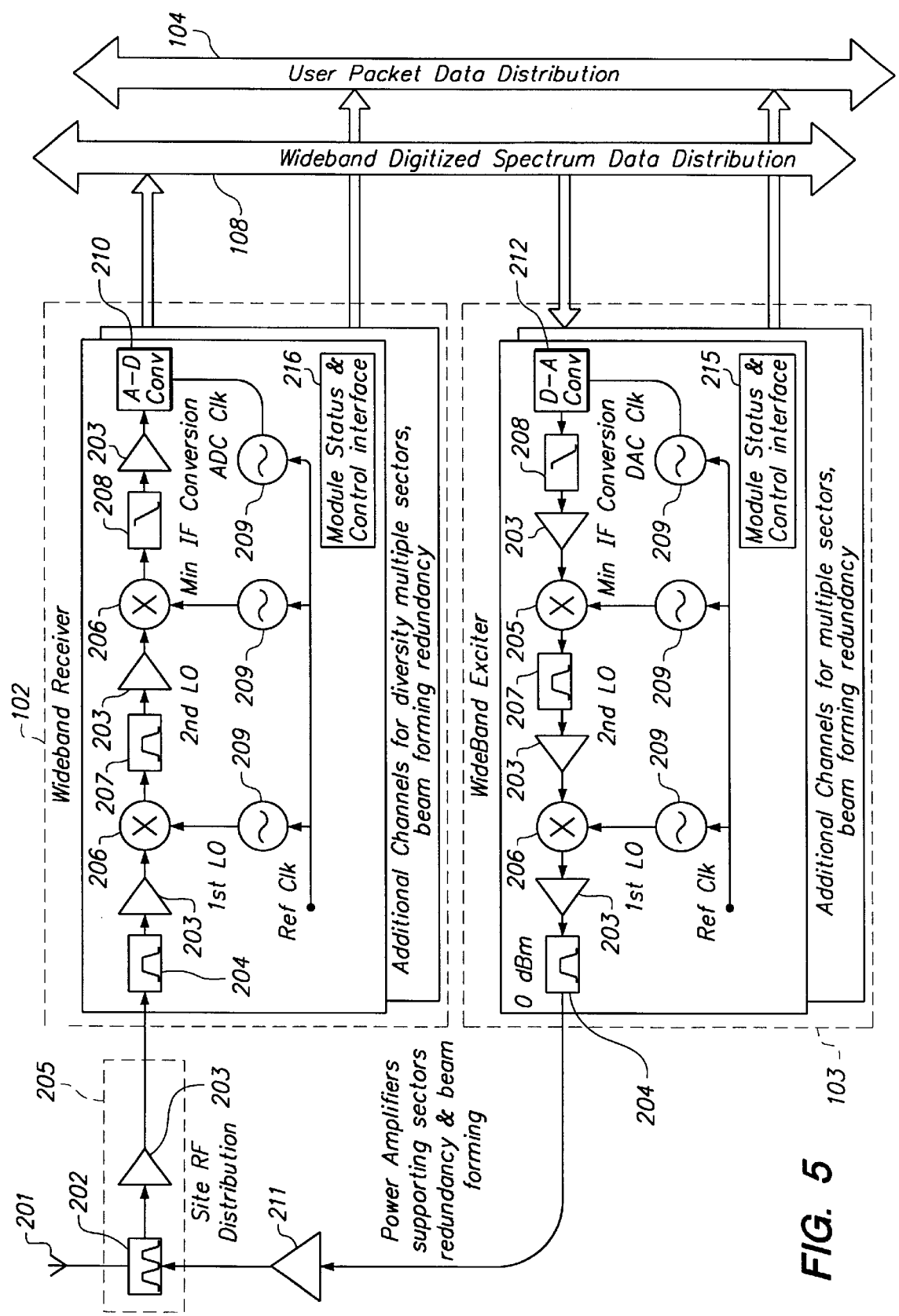
FIG. 5 illustrates in more detail the Radio Frequency (RF) section of the transceiver with Analog to Digital and Digital to Analog conversions.

The Wideband Receiver 102 and Exciter 103 RF Modules functional diagrams are illustrated in FIG. 5. The wideband receiver 102 is designed to be driven from a site RF distribution 111 network and minimizes this interface requiring a single, low gain RF feed per antenna element. High dynamic range amplifiers 203 and mixers 206 are utilized to obtain a large instantaneous dynamic range, thus preserving signal fidelity. The signal as collected by the antenna 100 is filtered 202, amplified 203, further filtered 203 and amplified 204. It is then mixed 206 by a first Local Oscillator 209 and filtered 207, amplified 203 and mixed down 206 to intermediate frequency by a second Local Oscillator 209. A filter 208 removes unwanted high frequency components and the resulting signal is further amplified 203 before being injected to the analog to digital converter 210. The clock to the analog to digital converter 210 is generated by a frequency source 209 locked to the site frequency reference 109. The samples at the output of the Analog to Digital Converter are routed to the 108 Wideband Data Distribution Bus. This Bus 108 is a high speed Time Division Multiplexed resource that connects any RF module to any Digital receiver module in a non-blocking fashion. All frequency and clock conversion oscillators are locked to the external site frequency reference 109 ensuring coherent operation. The Wideband Exciter 103 RF Module is also illustrated in FIG. 5. The samples from the 108 Wideband Data Distribution Bus are routed to the Digital to Analog Converter 212. The analog signal then is filtered 208, amplified 203 and mixed 206 using the second Local Oscillator 209 frequency. The RF signal is further filtered 207, amplified 203 and upconverted 206 using the first Local Oscillator 209 frequency. After proper amplification 203 and filtering 204 the signal goes to a multicarrier power amplifier that is responsible for providing enough RF power to the signal to reach the remote receiver after antenna radiation.

A block diagram for the Digital Receiver Module is shown in FIG. 6. The traffic channelization (that is baseband conversion) is performed using digital quadrature downconversion implemented by means of specialized high-speed ASIC 301. The samples from the Wideband Digitized Data Distribution 108 are downconverted to baseband by means of a quadrature mixer 302 where the mixing frequency is generated by a NCO (Numerically Controlled Oscillator) 303. An NCO. is a digital implementation of what is known in the analog domain as Voltage Controlled Oscillator. The two branches (In-Phase and In-Quadrature) of the samples are filtered by filters 314 to remove high frequency components of the mixing process. Each of the digital downconverters is connected to pulse shaping filters 306 that are matched to the transmitted pulse shapes and the output of these filters are sampled at a rate that is an integer multiple of the symbol rate. These samples are known to constitute a sufficient statistic for the trellis search 308 previously described. The synchronizer 307 is responsible for optimizing the sampling instants at the output of the shaping filter. Wavefield estimation 309 is performed iteratively using the Generalized Likelihood method described and the gradient update technique 310. The processing function following the demodulation 305 are related to the channel coding section of the communication system and are well-known to those skilled in the art of digital communications. A deinterleaver with channel decoder function 311 follows the demodulator. Data extraction 312 refers to the organization of the information bitstream in a way that is compatible with the particular application of the communication system.

Figure 7:
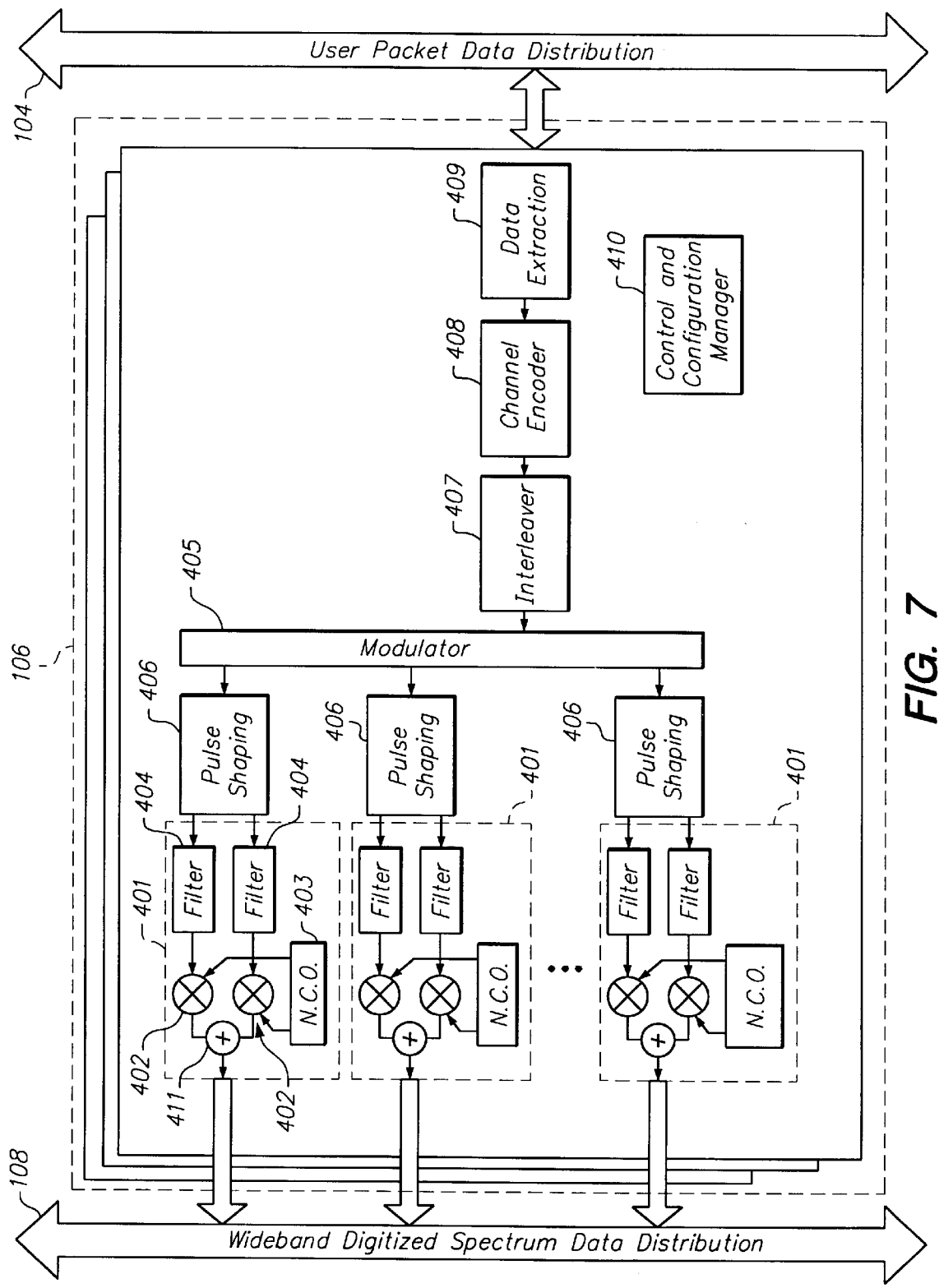
FIG. 7 illustrates in more detail the Digital Signal Processing section of the Transmitter.

The block diagram for the Digital Transmitter Module is shown in FIG. 7. The data is first properly organized in a bitstream from the user packet data distribution bus 104 by means of the data extraction function 409. Then, the data is properly encoded 408 and interleaved 407. The modulator 405 basically organizes the high-speed single bitstream in multiple lower speed bitstreams. These bitstreams are modulated according to the particular digital modulation format of interest (for example M-QAM or M-PSK) and routed to the pulse shaping filters 406. The device that follows is a digital up-converter 401 that translates to a first intermediate frequency the baseband signal at the output of the pulse shaping filters. The digital upconverter is constituted by filters 404, mixers (multipliers) 402, a Numerically Controlled Oscillator 403 and an adder 411. The digital samples at the output of the digital upconverter are routed by means of the Wideband Digitized Spectrum Data Distribution Bus 108 to the respective Wideband Exciter RF module 103 where they are converted to analog signals and upconverted to RF.

Each module 102, 103, 105, 106 is controlled by a respective microcontroller 215, 216, 313, 410, each of which also provides an interface with the data distribution resources (Wideband Digitized Spectrum Data Distribution 108 and User Data Distribution 104). Multiple modules can be replicated to meet traffic capacity and/or multiple antenna requirements.

C. Detailed Description of the Signal Processing Problem

Consider the communication between two base-stations where the transmit base-station has U antennas and the receive base-station is equipped with K antennas. At each antenna a different symbol stream is transmitted, so that the rate at which symbols are transmitted by the U-antenna transmitter is U times the rate at any single antenna.

It will be immediately evident to those skilled in the art of wireless receiver technology that the effect of a time-varying multipath channel can be represented at baseband (at the output of the pulse shaping filters 306 in FIG. 6) using the complex sequence of samples $$y_k(n)=a(n)^T h_k(n)+\eta_k(n), n=0, 1, 2, \ldots \text{RN}-1, k=1, 2, \ldots, K \quad (1)$$

where $^T$ means transpose for vectors or matrices, $$a(n)=[a_1(n), \ldots a_1(n-D), a_2(n), \ldots a_2(n-D), \ldots, a_U(n), \ldots a_U(n-D)]^T$$

is a vector that contains the N symbols transmitted by each of the U antennas interlaced (or zero-padded) with R−1 zeros and $$h_k(n)=[g_{k,1}(n,0), g_{k,1}(n,1), \ldots, g_{k,1}(n,D), g_{k,2}(n,0), g_{k,2}(n,1), \ldots, g_{k,2}(n,D), \ldots, g_{k,U}(n,0), \ldots, g_{k,U}(n,D)]^T.$$

is a vector of complex samples that contains the baseband discrete-time impulse responses from any of the U transmit antennas to the kth receive antenna. The generic element $g_{k,1}(n,m)$ of $h_k(n)$ represents the response of
1. pulse shaping at the lth transmit antenna;
2. transmit RF filters at the lth transmit antenna;
3. mth tap of the discrete time multipath impulse response at time n between lth transmit antenna and kth receive antenna;
4. receive RF filters at the kth receive antenna; and
5. pulse shaping at the l-th transmit antenna.

D is an integer that characterizes the length of the finite impulse response (FIR) $g_{k,1}(n,m)$ between any of the U transmit antennas to any of the K receive antennas. The index n simply describes the fact that such impulse responses are time-varying. The complex scalar $\eta_k(n)$ represents additive White Gaussian Noise afflicting the observation at the kth receive antenna.

More details regarding this technique of modeling multipath can be found in M. Martone, "An adaptive algorithm for adaptive antenna array low-rank processing in cellular TDMA base-stations," IEEE Trans. Commun., vol. 46, pp. 627–643, May 1998; M. Martone, "On MMSE Real-Time Antenna Array Processing Using Fourth-Order Statistics in the US Cellular TDMA System," IEEE Journal Sel. Areas in Comm., vol. 16, N. 8, pp. 1396–1410, Oct. 98; and M. Martone, "Cumulant-based adaptive multi-channel filtering for wireless communication systems with multi-path RF propagation using antenna arrays" IEEE Trans. Veh. Tech., Vol. 47, no. 2, pp. 377–391 May 98.

The samples $y_k(n)$ are samples of the baseband signal collected at the kth antenna at sampling rate equal to R/T if we denote 1/T as the rate at which the U antennas transmit synchronous symbols. More explicitly
1. $a_j(n)$ is a complex number representing a point (symbol) in the constellation if n is equal to 0, R, 2R, 3R, . . . , NR; and
2. $a_j(n)$ is equal to zero if n is not equal to 0, R, 2R, 3R, . . . , NR.

The integer parameter R is the so called oversampling factor and it represents the number of signal samples that are contained in one symbol period T. It is well-known that R=1 is sufficient for optimum detection. However in a practical receiver R>1 makes implementation more robust with respect to synchronization issues. It is important to remind that in the model at hand for K=1, L=1, R=1 and static channel, that is $g_{k,1}(n,m)=g_{l,1}(m)=g(m)$ for any n, equation (1) collapses into the well-known model for reception of digital signals in presence of Intersymbol Interference (see J. G. Proakis, "Digital communications," McGraw-Hill, Third Edition, 1995).

$$y_1(n)=\Sigma_m g(m)a_1(n-m)+\eta_1(n), n=0, 1, 2, \ldots \text{RN}-1 \quad (2)$$

Equation (2) represents an unrealistic model in real life wireless communication channels and much more importantly the communication system modeled by equation (2) has a maximum throughput of N symbols per NT seconds, while equation (1) is representative of a communication system where the throughput is UN symbols per NT seconds.

The task of the receiver base-station signal processing is to obtain an estimate of the vector of symbols a(n) for n=0, 1, . . . , NR−1, (in other words an estimate of the sequence $a=[a(0)^T, a(1)^T, \ldots, a(\text{NR}-1)^T]^T$), given only the received samples $y_k(n)$.

If the communication system uses Q-ary symbols then the vector a can be any of $Q^{UN}$ different vectors. We identify the hypothetical vector as $s=[s(0)^T, s(1)^T, \ldots, s(\text{NR}-1)^T]^T$.

The Maximum Likelihood formulation of the detection/estimation problem can be stated as in the following:
Find the minimum of $$L_N[s]=\Sigma_{k=1, 2, \ldots, K}\Sigma_{n=0, 1, \ldots \text{NR}-1}|y_k(n)-s(n)^T h_k(n)|^2$$

over "any possible"

$$s=[s(0)^T s(1)^T, \ldots, s(\text{NR}-1)^T]^T$$

Observe that "any possible" refers in the above formulation to the fact that since the elements of s are symbols that can assume only a finite number of values (the Alphabet of the digital modulation method of choice), there will also be only a finite number of vectors s. Also, one of the many $s=[S(0)^T, s(1)^T, \ldots, s(\text{NR}-1)^T]^T\_$ is indeed the transmitted one vector $a=[a(0)^T a(1)^T, \ldots, a(\text{NR}-1)^T]^T$.

However the big practical problem in this optimum formulation of the problem is that the receiver does not know the multipath channel parameters (the wavefield parameters). Prior art has solved this problem sending training sequences of known symbols that allow channel estimation. This technique has two drawbacks:
1. it works only for static channels (that is non-time varying); and
2. it dramatically reduces the throughput of the system because of the periodical training.

The first modification is to formulate the problem differently as in the following:
Find the minimum of $$L_N[s]=\Sigma_{k=1, 2, \ldots, K}\Sigma_{n=0, 1, \ldots \text{NR}-1}|y_k(n)-s(n)^T h_k(n)|^2$$

over "any possible"

$$s=[s(0)^T s(1)^T, \ldots, s(\text{NR}-1)^T]^T$$

and over $h_k(n)$.
This problem is solved in two stages:
Step 1: For any possible s_find the Maximum Likelihood Estimate of $h_k(n)$, call it $h_k[s,n]$,
Step 2: Find the minimum of $L_N[s]=\Sigma_{k=1, 2, \ldots, K\_}$ $\Sigma_{n=0, 1, \ldots \text{NR}-1}|y_k(n)-s(n)^T h_k[s,n]|^2$ over any possible s.
This two-step particular solution of the problem is called Generalized Likelihood solution (see L. Van Trees, "Detection, Estimation, and Modulation Theory" Part I, John Wiley 1968). Unfortunately this way of solving the detection problem still places a formidable computational challenge, essentially because a large number of free parameters are contained in $h_k(n)$, for any n and any k. In fact $h_k(n)$ is a nonparsimonious (in other words it has significant redundancy) representation of the wavefield multipath propagation environment. To minimize the amount of redundancy in $h_k(n)$ and get to the possible minimum number of parameters that truly characterize $h_k(n)$ especially as connected to our detection problem we use a wavelet orthonormal basis expansion of each element of $h_k(n)$, the wavefield response.

D. Multiresolution Decomposition of the Wavefield Multipath Response

An unknown deterministic or random signal can be decomposed according to its resolution (components at different levels). An excellent and very intuitive explanation of the concept of decomposing a signal at different resolutions is contained in the book "Wavelets and Filter Banks" by G. Strang and T. Nguyen, Wellesley-Cambridge Press, 1996.

The crucial point of almost all of the proposed methods for the detection of a signal of the form in (1) (even in the case of a single transmit antenna) is based on the assumption that the multipath channels are quasi-static, that is time invariant over the length of the transmitted frame. Slow variations of the channels are then compensated by using adaptive algorithms that ultimately force the estimate to be constantly in search of a convergence point. If the channel coefficients variations in time are fast with respect to the convergence time of the adaptive algorithm, significant degradation may result. A more reasonable alternative is to model the time-varying components of the impulse response of the multipath channel as low-pass Gaussian processes with their correlation representing ensemble average characteristics. These average characteristics are in turn used to fit parametric models so that a bank of Kalman filters can be used for tracking. This approach is impractical because the parametric models that best fits the channel dynamics have a large number of free parameters. Moreover, the generalization of this approach to a multi-antenna environment where possibly multiple different channel responses have to be estimated/tracked, is definitely a formidable task in terms of computational effort.

This invention departs from these well-known and obvious approaches in search of new methods that more "economically" can characterize the time varying nature of the detection/estimation problem. A multiresolution representation of the fading process in each component of the channel response is introduced, elaborating some ideas of (J. Zhang and G. Walter, "A wavelet-based KL-like expansion for wide-sense stationary random processes" IEEE Transactions on Signal Processing, vol. 42, no. 7, pp. 1737–1745, July 1994); (R. W. Dijkerman and R. R. Mazumdar, "Wavelet representations of stochastic processes and multiresolution stochastic models" Transactions on Signal Processing, vol. 42, no. 7, pp. 1640–1652, July 1994), M. I. Doroslovacki and H. Fan, "Wavelet-based linear system modeling and adaptive filtering," Transactions on Signal Processing, vol. 44, no. 5, pp. 1156–1167, May 1996. The unknown channel time variations are in fact decomposed using optimal unconditional bases such as orthonormal wavelet bases. It is extremely important to realize that modeling of linear systems by basis functions can turn a time-varying system identification problem into a time-invariant one. Essentially inspired by Fourier harmonic analysis ideas, simple exponential bases were used in G. B. Giannakis and C. Tepedelenlioglu, "Basis-expansion models and diversity techniques for blind identification and equalization of time-varying channels," Proceedings of the IEEE, vol. 86, no. 10, pp. 1969–1986, Oct. 1998.

The exponential basis function of a Fourier-like decomposition has infinite duration, so clearly any representation of a time-localized signal is not efficient and adequate. To connect this consideration with a simple and intuitive example, consider a signal made of two pure oscillations occurring at non-overlapping distinct time intervals.

The Fourier transform reveals the presence of the two tones, but with no localization in time, which forces a wrong representation for the signal. In other words, representations based on exponentials lack "parsimony." The time-varying reflections of electromagnetic waves caused by a moving transmitter (or receiver) are in nature very similar to a signal where multiple propagation modes are present at different times. To represent the frequency behavior of a signal locally in time, the signal should be analyzed by functions which are localized both in time and frequency, for instance, signals that are compactly supported in the time and frequency domains. In reality no function can be compactly supported simultaneously in time and frequency so the scientific community has directed intense research efforts in the development of functions with "good" time-frequency localization: wavelets are the best known tool for linear time-frequency analysis. An obvious solution to the time-localization problem of the Fourier analysis is to localize the tones in the Fourier representation by windowing several time-consecutive intervals of the analyzed signal. This is in fact the short-time Fourier transform which basically operates a partition (or "tiling") of the time-frequency plane in rectangles of equal area. Wavelets can offer a different and valuable compromise: the frequency localization is logarithmic in frequency. Looking at the time-frequency plane, this means that time localization gets finer at the highest frequencies. The wavelet transform replaces the Fourier transform's sinusoidal waves by a family of functions generated by translations and dilations of a single window called a wavelet. Complicated signals can be represented using only a few wavelet and scaling functions and statistical signal modeling and processing methods based on the wavelet transform are in most cases much more effective than classical time-domain or frequency-domain approaches.

We give a brief explanation of the main concept disclosed in this invention by using an oversimplified continuous time single antenna model. Consider a sequence of digital symbols collected in the vector a, digitally modulated to form the signal waveform x(t,a). The signal x(t, a) is the input to h(t, τ) the time-varying impulse response of a multi-path channel, as $$y(t) = \int_{\tau=-\infty}^{t} h(t, t-\tau) x(\tau, a) d\tau.$$

Assume that the kernel h(t, τ) can be represented by an expansion of the form $$h(t,\tau) = \Sigma_{l \in H} w_l(\tau) \Psi_l(t)$$

where $\{\Psi_l(t)\}_{l \in H}$ is a set of functions (wavelets) and $\{w_l(\tau)\}_{l \in H}$ are the (wavelet) coefficients of the expansion. Using this representation we can express y(t) as $$y(t) = \Sigma_{l \in H} \Psi_l(t) \int_{\tau=-\infty, t} w_l(t-\tau) x(\tau, a) d\tau = \Sigma_{l \in H} \Psi_l(t) x'_l(\tau, a)$$

where $x'_l(\tau, a) = \int_{\tau=-\infty, t} w_l(t-\tau) x(\tau, a) d\tau$. This representation can be economical if the set $\{\Psi_l(t)\}_{l \in H}$ contains a small number of functions. The multiplication $\Psi_l(t) x'_l(\tau, a)$ emphasizes the time selection of the input content and its frequency translations. Observe that $x'_l(\tau,a)$ for any l in the set H is the output of a time-invariant linear filtering operation: it is simply obtained filtering $x(a,t)$ by $w_l(t)$. Another interesting property of this representation is that it gives us the ability to select for any given time interval only those wavelet coefficients responses $w_l(t)$ that affect the output during the time interval of interest. The use of wavelet bases allows the selection of the subset in H which will model the local and global characteristics of the channel dynamics. A clear attempt of the engineering community to have a global characterization of the time-varying nature of a multipath propagation link is the well-known WSSUS (Wide Sense Stationary Uncorrelated Scattering) model (J. G. Proakis, "Digital communications," McGraw-Hill, Third Edition, 1995)). The WSSUS assumption is only an approximation of the real propagation mechanism in a dense multi-path environment. Indeed $h(t, \tau)$ has smooth (low frequency) variations with occasional rapid changes that can not be possibly modeled as stationary. In particular a channel model which is uniquely based on ensemble average characteristics will inevitably loose local characteristics that are caused for example by rapid transitions and sudden changes of the impulse response dynamics (for example the mobile transmitter coming to a sudden stop), while the multiresolution model will retain such information in a few high resolution "detail" coefficients. The idea is that the wavelet-based representations can better model not only non-stationary but also stationary processes. We will however use the WSSUS model to tune our channel representation and to eliminate gross redundancy: in other words second-order statistics will provide general guidelines on how to select the low-resolution coefficients. It is however understood that retaining only the low-resolution coefficients will not give us the kind of "parsimony" that we expect from a wavelet-based representation. To achieve this goal a few high resolution coefficients empirically selected will be maintained.

Going back to our original discrete-time problem, we would like to obtain a practical basis representation for the discrete-time channel $g_{i1,i2}(n,k)$ that is easily parameterized, it retains the essential features of the fading process and it characterizes these features using a small number of time-invariant coefficients. These requirements can be satisfied using a discrete-time wavelet series representation. The orthonormal expansion we will derive can be thought more properly as a multiscale sub-band decomposition using filterbanks of the sampled response of a multipath channel. We direct the interested reader to P. P. Vaidyanathan, "Multirate Systems and Filter Banks," Prentice Hall, 1993, and in particular to 0. Rioul, "A discrete-time multiresolution theory," IEEE Transactions in Signal Processing, vol. 41, no. 8, pp. 2591–2606, Aug. 1993, where a "discrete-time" approach to multiresolution representations is described. To simplify notation consider $g(n,k)$ as the generic response for a generic set of indices i1,i2. It is fundamental to observe that $g(n,k)$ can be represented at lower resolution applying a half band low-pass filter having impulse response $c_0(n)$ followed by a down-sampling-by-two operation $$\zeta_{1,m}(k)=\Sigma_j c_0(j)g(2m-j,k).$$

This equation represents a mapping from a vector space to itself. An added "detail" can be obtained by using a high-pass filter with impulse response $c_1(n)$, then again down-sampling by two $$\xi_{1,m}(k)=\Sigma_j c_1(j)g(2m-j,k).$$

The filters $c_i(n)$, I=0,1 satisfy some regularity constraints and form an orthonormal set. If $c_i(n)$ (in the z-domain $C_i(z)$) for I=0,1 is a dyadic perfect reconstruction filter bank (P. P. Vaidyanathan, "Multirate Systems and Filter Banks," Prentice Hall, 1993), one can think of $\zeta_{1,m}(k)$ and $\xi_{1,m}(k)$ as a decomposition of $g(n,k)$ onto a discrete time orthonormal basis with the following (perfect) reconstruction rule $$g(n,k)=\Sigma_m \zeta_{1,m}(k)c_0(2m-n)+\Sigma_m \xi_{1,m}c_1(2m-n),$$

which is indeed a sum of orthogonal projections. Using the same filters $c_i(n)$, 1=0,1, the decomposition could be performed again in lowpass and highpass down-sampled components, and then further the lowpass component split again, up to a desired "depth" or resolution, so that one can always "explode" the lowpass component resolution $$\zeta_{j,m}(k)=\Sigma_m \zeta_{j+1,m}(k)c_0(2m-n)+\Sigma_m \xi_{j+1,m}c_1(2m-n)$$

For example consider the equation above for j=1 to get $$g(n,k)=\tau_m[\tau_m,\zeta_{2,m},(k)c_0(2m'-m)+\Sigma_m,\xi_{2,m},(k)c_1(2m'-m)]c_0(2m-n)+\Sigma_m\xi_{1,m}(k)c_1(2m-n)$$

$$=\Sigma_m\zeta_{2,m}(k)c_0^{(2)}(2^2m-n)+\Sigma_{l=1,2}\Sigma_m\xi_{1,m}(k)c_1^{(1)}(2^1m-n)$$

where $c_0^{(2)}(n)$, $c_1^{(2)}(n)$ and $c_1^{(1)}(n)$, l=1,2 are filters obtained in the z-domain as $$C_0^{(2)}(z)=C_0(z)C_0(z^2),\ C_1^{(1)}(z)=C_1(z),\ C_1^{(2)}(z)=C_1(z^2)C_0(z).$$

In the last equation we have used the Noble identity (P. P. Vaidyanathan, "Multirate Systems and Filter Banks," Prentice Hall, 1993) which says that a downsampler by two, followed by a filter $F(z)$ is equivalent to the filter $F(z^2)$ followed by the downsampler by two.

We can think of the derived expansion for $g(n,k)$, as a decomposition of $g(n,k)$ onto a discrete time orthonormal basis at resolution level P=2. The method can be applied recursively to obtain at generic resolution depth P a filter bank with P+1 branches.

The channel parameter $g_{i1,i2}(n,k)$ at any fixed k can be considered a signal at resolution 0 with an associated signal subspace $V_0$=S. Of course $g_{i1,i2}(n,k)$ for i1=1, 2, ..., U and i2=1, 2, ...,K and n=0, 1, ...,NR-1 spanning $V_0$ perfectly represents the wavefield response, but it has high degree of redundancy and it complicates our detection problem.

The orthonormal basis $c_p^{(q)}(2^q m-n)$ for p=0,1 and q=1, 2, ... P can be used to decompose $g_{i1,i2}(n,k)$ at resolution P $$g_{i1,i2}(n,k)=\Sigma_{m=0,1,\ldots,NR/2^P-1}\zeta_{P,m,i1,i2}(k)c_0^{(P)}(2^P m-n)+\Sigma_{l=1,2,\ldots,P}\Sigma_{m=0,1,\ldots,NR/2^l-1}\xi_{l,m,i1,i2}(k)c_1^{(l)}(2^l m-n) \quad (3)$$

The smaller P the higher the resolution (is the highest resolution). So greater P means less redundancy in the wavefield response representation. The filters $c_i(n)$ for i=0,1 satisfy some regularity constraints, and form an orthonormal set: they are defined as a dyadic perfect reconstruction filter bank ("Wavelets and Filter Banks" by G. Strang and T. Nguyen, Wellesley-Cambridge Press, 1996). We are not interested in the details of why these constraints are related to the discrete time wavelet transform, all we care is that $\zeta_{P,m,i1,i2}(k)$ and $\xi_{l,m,i1,i2}(k)$ are <low redundancy>representations of $g_{i1,i2}(n,k)$. Equation (3) can be rewritten in vector form as $$g_{i1,i2}(n,k)=c(P,n)^T w_{i1,i2}(P,k)$$

In particular, given a particular P we can truncate the second summation by considering that we can neglect the last $\Sigma_{n=1,\ldots,M}NR\ 2^{-m}$ components of the vector $w_{i1,i2}(k)$ (because typically very close to zero in real life multipath channels) and of the vector c(P,n) so we can obtain a parsimonious representation of the channel as $$h_k(n)=C(P,M)w_k(P,M) \quad (4)$$

where C(P,M) is simply a matrix of vectors $c(P,n)^T$ where the last $\Sigma_{n=1,\ldots,M}NR\ 2^{-m}$ have been eliminated and $w_k(P,M)$ is simply a long vector obtained by the concatenation of vectors $w_{i1,i2}(P,k)$ for i1=1, 2, ..., U and i2=1, 2, ..., K and k=0, 1, ..., D where the last $\Sigma_{n=1,\ldots,M}NR\ 2^{-m}$ have been eliminated also.

Now that we are equipped with the representation (4) of the wavefield response we go back to equation (1) and observe that we can write $$y_k(n)=a(n)^T C(P,M)w_k(P,M)+\eta_k(n)=a(n)^T w_k(P,M)+\eta_k(n), \quad (5)$$

where we have indicated $a(n)^T=a(n)^T C(P,M)$.

Denote now $d(n)^T=s(n)^T C(P,M)$ and $d=[d(0)^T, d(1)^T, \ldots, d(NR-1)^T]^T$, and reformulate the Generalized 2-step Likelihood problem as:

Step 1: For any possible d find the Maximum Likelihood Estimate $w_k(P,M)$, call it $w_k[P,M,d]^2$ and Step 2: Find the minimum of $L_N[d]=\Sigma_{k=1,2,\ldots,K} \Sigma_{n=0,1,\ldots NR-1}|y_k(n)-d(n)^T w_k[P,M,d]|^2$ over any possible d.

The problem is now in simple form because the Maximum Likelihood estimate of $w_k(P,M)$ given s is dramatically simplified by the fact that the wavefield response is characterized by a static vector $w_k(P,M)$.

E. Focusing the Generalized Energy Detector

This subsection describes a method to select the proper integer parameters M and P, given a certain accuracy of representation of the wavefield space.

Described above is the practice that a multiresolution decomposition of the wavefield response dynamics obtains a nested subspace representation for the signal $$S=V_0 \subset V_1 \subset \ldots V_P \ldots \quad (6)$$

at increasingly high level of detail. Of course one is interested in a decomposition which is the least possible computationally expensive, that is the "smallest" representation subspace, for a "reasonable" approximation accuracy.

If the unknown channel variations are characterized statistically (for example using the well-known WSSUS, Wide Sense Stationary Uncorrelated Scattering assumption) S is not anymore a linear subspace but an ensemble of linear subspaces and it is possible to design a representation subspace that is close "on average" to S.

A measure of the distance between two closed subspaces S and V is the deviation d(S,V) which is based on the concept of (constrained) Kolmogorov n width.

The deviation is a one-sided measure. That means that it addresses only the question of how well S is included in V but not vice versa, which is also an important issue. In fact, V may be too "large" to be of any practical interest. What a practical implementation really needs is the "smallest" subspace that minimizes the deviation. A "small" subspace implies that the number of coefficients needed to represent the orthogonal projection is small, which results in less degrees of freedom, reduced sensitivity to noise and simplicity of computation. Since the subspace representation for S over a set of predetermined basis vectors indexed by the integer P (and for each P approximated by M) is of interest, the procedure is as follows:

1. find the deviation for each subspace with respect to S in the class of subspaces represented by Equation (6);
2. select the one (that is select the resolution depth P) that yields a tolerably small deviation; and
3. "shrink" the subspace retaining only part of the coefficients and select M in a way that the deviation is still close to the one selected in step 2.

If the unknown channel variations are characterized statistically, S is not anymore a linear subspace but an ensemble of linear subspaces. Statistical characteristics of the fading channel are typically available from experimental measurements in the form of a scattering function or auto-correlation function. This knowledge translates to the knowledge of the following correlations $$E\{g_{i1,i2}(n,k1)^* g_{i3,i4}(n+m,k2)\}=R_{i1,i2,i3,i4}(m,k1,k2),$$

for any i1,i2,i3,i4,m,k1,k2.

The average deviation between S and V is $$d(S,V)^2=E_s-\text{Trace}[A^{T*} P_A A R_h] \quad (7)$$

where
1. Trace[ ] is the Trace operator for a matrix, that is the sum of the elements along the diagonal;
2. $A=I_K \otimes (I_{NR} \otimes s)$;
3. $P_A=B(B^{T*}B)^{-1}B^{T*}$ with $B=[d(0), d(1), \ldots, d(NR-1)]$;
4. is the Kronecker product operator between two matrices (the element-wise product);
5. * means complex conjugation for scalars, vectors and matrices;
6. $R_h=E\{h\ h^{T*}\}$ with $h=[h_1(0)^T h_1(1)^T, \ldots, h_1(NR-1)^T h_2(0)^T, \ldots, h_2(NR-1)^T, h_K(0)^T, \ldots, h_K(NR-1)^T]^T$; and
7. E{ } means statistical expectation.

Detailed and rigorous derivations that explain equation (7) are contained in Appendix 1 of Provisional Application No. 60/136,699, filed on May 28, 1999 incorporated herein by reference.

A technique to obtain the best values for P and M is then
1. Find the deviation for each subspace with respect to S in the class of subspaces represented by Equation (6) over the range $1 \leq p \leq P_{max}$;
2. Select the smallest p such that $d(S,V_p)^2-d(S,V_{p-1})^2 \leq \Delta$; and
3. "shrink" the subspace retaining UK (D+1) NR $(1-\Sigma_{m=1,2,\ldots,M}2^{-m})$ coefficients in the formation of the function $L_N[d]$ for $M_{min} \leq M \leq M_p$.

Observe that $\Delta$ is a preselected small number that determines the approximation accuracy of the representation subspace.

Figure 8:
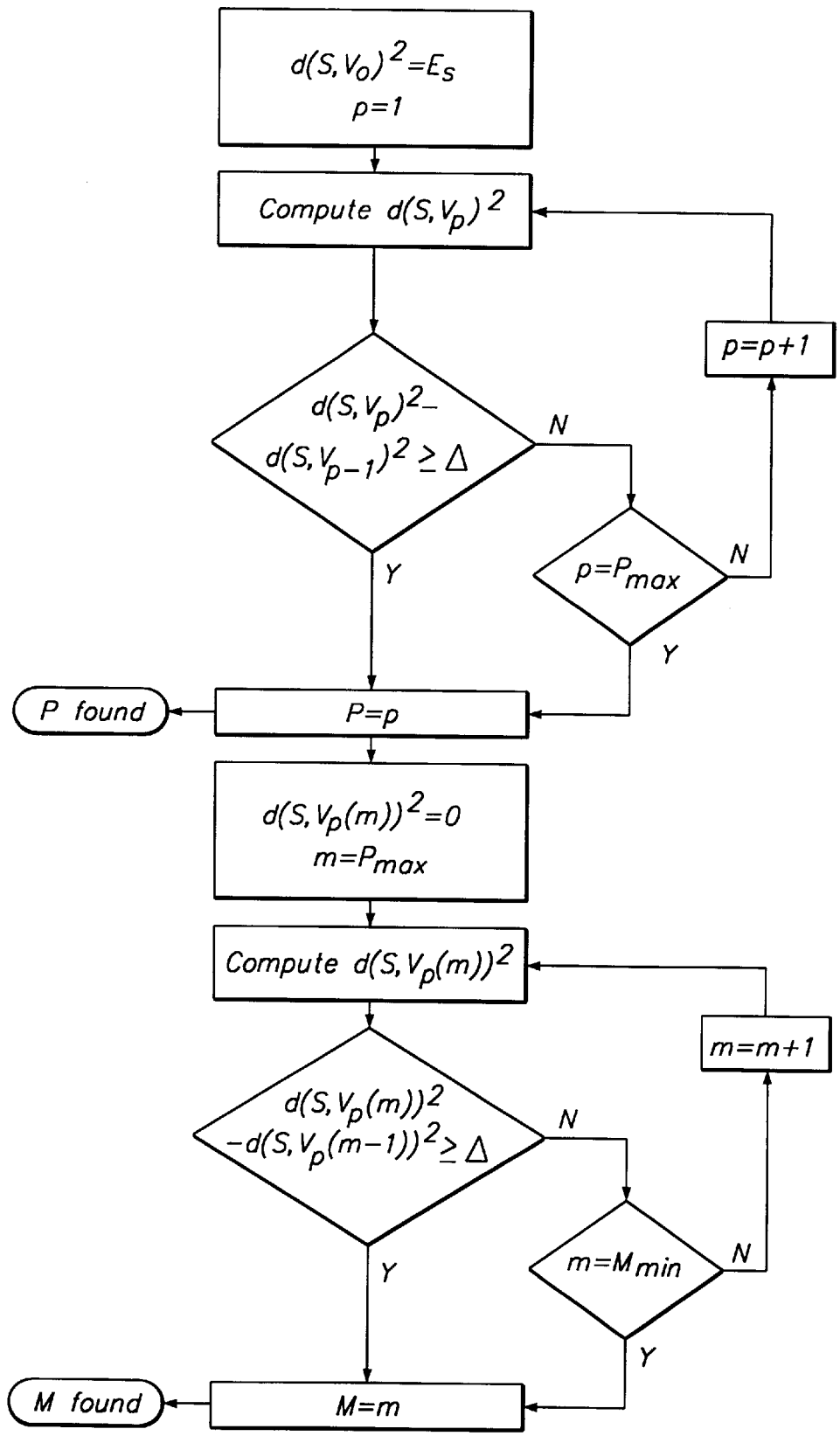
FIG. 8 is a flowchart procedure to find the optimum P and M.

The algorithmic procedure to find the optimum P and M is detailed in the flow diagram of FIG. 8.

F. Real-Time Implementation

There is a celebrated method known as the Viterbi algorithm (G. D. Forney, "Maximum Likelihood Sequence Estimation of Digital Sequences in the Presence of Intersymbol Interference," IEEE Trans. Inform. Theory, vol. IT-18, pp. 363–378, May 1972) that performs the task of minimizing $L_N[d]$ efficiently. The significance of the Viterbi algorithm is that the number of computations required for the detection of a sequence of length N grows only linearly with N. The Viterbi algorithm is well known to those skilled in the art of Maximum Likelihood Sequence Detection (or Estimation).

To apply the Viterbi algorithm one has to reduce the function $L_N[s]$ to a sum of terms where each term corresponds to the length of a branch in a suitable trellis (or tree) diagram. Also, one needs a real-time algorithm to compute the estimated vector $w_k[P,M,d]$ in $L_N[d]$ on a sample by sample basis. This can be easily derived defining $w_{k,n}[P,M,d]$ as $w_k[P,M,d]$ estimated at time step n. Possible approaches are gradient-based methods (like the LMS, Least Mean Squares) and Recursive Least Squares-based (RLS) methods.

To reduce the function $L_N[d]$ to a sum of terms where each term corresponds to the length of a branch in a suitable trellis (or tree) diagram, it is convenient to define the variables:

$$F_n = [d(n)^T, d(n-1)^T, \ldots, d(n-D)^T]^T \text{ for } n=D, D+1, \ldots, NR$$

and the quantities:

$$G_{n+1}(F_D, \ldots, F_{n+1}) = \Sigma_{k=1,\ldots,K} \Sigma_{m=1,\ldots,n} |y_k(m) - d(m)^T w_{k,m}[P, M, d]|^2$$

where $w_{k,m}[P,M,d]$ is recursively computed as:

$$w_{k,m}[P,M,d] = w_{k,m-1}[P,M,d] + \mu[y_k(m) - d(m)^T w_{k,m}[P,M,d]] d(m)^T m=1, 2, \ldots, n,$$

and the initialization is $w_{k,m}[P,M,d]=0$.

Observe that $G_{n+1}(F_D, \ldots, F_{n+1})$ depends on $d(m)$, for $m=1, 2, \ldots, n$, that is, on a path in the trellis.

Also, defining $$J_{n+1}(F_n, F_{n+1}) = \Sigma_{k=1,\ldots,K} |y_k(n) - d(n)^T w_{k,n}[P,M,d]|^2$$

we see that $J_{n+1}(F_n, F_{n+1})$ depends on $d(n)$ and $d(n-1)$ only, that is, on a branch in the trellis. It is easy to verify that:

$$G_{n+1}(F_D, \ldots, F_{n+1}) = G_n(F_D, \ldots, F_n) + J_{n+1}(F_n, F_{n+1}).$$

There is a one-to-one correspondence between the sequence of transmitted symbols and the sequence of states $F_D, \ldots, F_{n+1}$. Therefore the problem of selecting the most likely symbol-sequence is equivalent to that of selecting the most likely sequence of states. The Maximum Likelihood detection problem has been reduced to the selection of a path through the trellis, once the branches joining states F, and Fn+1 have been assigned the values taken by the function $J_{n+1}(F_n, F_{n+1})$ usually referred as the branch metric. Any particular digital modulation scheme, with its own associated alphabet, length D, and number of transmit antennas U will generate a different trellis structure. The minimum-metric path corresponds to the most likely sequence of states and hence to the most likely sequence of symbols. A summary of the necessary steps is given below. Step 1 Initialize|: Let n=D, compute $G_D(F_D)$ for every possible value of $F_D$ and store them.

Step 2 Extend survivor paths: Let n=n+1 and compute $J_{n+1}(F_n, F_{n+1})$ for each pair of states $F_n, F_{n+1}$ such that the transition from $F_n$ to $F_{n+1}$ is allowed by the trellis structure. Step 3 Drop Paths: For each state $F_{n+1}$ compute $u_{n+1}(F_{n+1})$ as the minimum over any $F_{n+1}$ of $u_{n+1}(F_{n+1}) + J_{n+1}(F_n, F_{n+1})$ where $u_D(F_D) = G_D(F_D)$ by definition and $u_{n+1}(F_{n+1})$ is recursively computed. Step 4 Trace-back procedure. Step 5 Iterate: Go to Step 2 if not n=N.

The detected symbol is given at the output by means of the trace-back procedure, the procedure that outputs the estimated symbol as the one associated with the minimum euclidean distance path among the retained paths (also defined survivors).

G. Conclusion

The invention provides many advantages over known techniques. Advantages of the invention include the ability to communicate high data rates from one location to another, where the data rates are in excess of those conventionally achievable.

Having disclosed exemplary embodiments and the best mode, modifications and variations may be made to the disclosed embodiments while remaining within the scope of the invention as defined by the following claims.

What is claimed is:

1. An apparatus for communicating information from one location to another through at least a three-dimensional wavefield space having dynamic time-selective, frequency-selective and space-selective attributes using a multi-dimensional communication protocol comprising:

a transmitter having a terminal configured to receive a message corresponding to first information and to encode a plurality of signals associated with the message;

a first plurality of antennas coupled to the transmitter and configured to transmit the plurality of signals associated with the message through the wavefield space having dynamic time-selective, frequency-selective and space-selective attributes;

a second plurality of antennas configured to receive the plurality of signals associated with the message through the wavefield space having dynamic time-selective, frequency-selective and space-selective attributes; and a receiver coupled to the second plurality of antennas and configured to decode the plurality of signals associated with the message to reconstruct the first information, wherein the receiver decodes the plurality of signals having only incomplete advance knowledge of the time-selective, frequency-selective and space-selective attributes of the wavefield space through which the plurality of signals were transmitted and received.

2. An apparatus for communicating information from one location to another through a wavefield space having time-selective, frequency-selective and space-selective attributes using a multi-dimensional communication protocol comprising:

a transmitter having a terminal configured to receive a message corresponding to first information and to encode a plurality of signals associated with the message;

a first plurality of antennas coupled to the transmitter and configured to transmit the plurality of signals associated with the message;

a second plurality of antennas configured to receive the plurality of signals associated with the message; and a receiver coupled to the second plurality of antennas and configured to decode the plurality of signals associated with the message to reconstruct the first information, wherein the receiver has incomplete advance knowledge of the time-selective, frequency-selective and space-selective attributes of the wavefield space; wherein the multi-dimensional communication protocol is at least a three-dimensional communication protocol;

the transmitter includes a plurality of transmit modules that each encode at least a portion of the message; and the receiver includes a plurality of receiver modules that each decode complementary portions of the message to reconstruct the first information using the time-selective, frequency-selective and space-selective attributes of the wavefield space.

3. An apparatus for communicating information from one location to another through a wavefield space having time-selective, frequency-selective and space-selective attributes using a multi-dimensional communication protocol comprising:

a transmitter having a terminal configured to receive a message corresponding to first information and to encode a plurality of signals associated with the message;

a first plurality of antennas coupled to the transmitter and configured to transmit the plurality of signals associated with the message;

a second plurality of antennas configured to receive the plurality of signals associated with the message; and a receiver coupled to the second plurality of antennas and configured to decode the plurality of signals associated with the message to reconstruct the first information, wherein the receiver has incomplete advance knowledge of the time-selective, frequency-selective and space-selective attributes of the wavefield space, and the receiver is configured to execute a statistical procedure based on multiresolution wavelet signal processing to decode the plurality of signals.

4. The apparatus of claim 3, wherein:

the receiver is configured to execute a generalized likelihood detection procedure specially adapted for the time-selective, frequency-selective and space-selective attributes of the wavefield space; and the procedure is based at least in part on an efficient representation of the space-time wavefield response using wavelet-based signal decompositions.

5. The apparatus of claim 4, wherein:

the receiver is configured to estimate the time-selective, frequency-selective and space-selective attributes of the wavefield response using a multiresolution signal subspace that approximates multi-path characteristics of the wavefield space.

6. An apparatus for communicating information from one location to another though a multi-path wavefield space having time-selective, frequency-selective and space-selective attributes using a multi-dimensional communication protocol comprising:

a first transceiver having a terminal configured to receive a message corresponding to first information and to encode a plurality of signals associated with the message;

a first plurality of antennas coupled to the first transceiver and configured to transmit the plurality of signals associated with the message;

a second plurality of antennas configured to receive the plurality of signals associated with the message; and a second transceiver coupled to the second plurality of antennas and configured to decode the plurality of signals associated with the message based at least in part on a decomposition of essential degrees of the time-selective, frequency-selective and space-selective attributes of the multi-path space to reconstruct the first information, the second transceiver using incomplete advance knowledge of the time-selective, frequency-selective and space-selective attributes of the multi-path wavefield space to decode the plurality of signals.

7. The apparatus of claim 6, wherein the protocol is at least a three-dimensional protocol and wherein:

the first transceiver includes a plurality of transmit modules that each encode at least a portion of the message; and the second transceiver includes a plurality of receiver modules that each decode complementary portions of the message to reconstruct the first information using the time-selective, frequency-selective and space-selective attributes of the wavefield space.

8. The apparatus of claim 6, wherein:

the second transceiver is configured to execute a statistical procedure based on multiresolution wavelet signal processing to decode the plurality of signals.

9. The apparatus of claim 8, wherein:

the second transceiver is configured to execute a generalized likelihood detection procedure specially adapted for the time-selective, frequency-selective and space-selective attributes of the wavefield space; and the procedure is based at least in part on an efficient representation of the space-time wavefield response using wavelet-based signal decompositions.

10. The apparatus of claim 9, wherein:

the second transceiver is configured to estimate the time-selective, frequency-selective and space-selective wavefield response using a multiresolution signal subspace that approximates the multi-path wavefield space.

11. A method of communicating information from one location to another though a multi-path space having time-selective, frequency-selective and space-selective attributes using a multi-dimensional communication protocol comprising the steps of:

receiving a message at an input terminal corresponding to first information;

encoding a plurality of signals associated with the message using an encoder;

transmitting the plurality of signals associated with the message using a first plurality of antennas;

receiving the plurality of signals associated with the message using a second plurality of antennas; and decoding the plurality of signals associated with the message to reconstruct the first information using a receiver, wherein the decoding step uses incomplete advance knowledge of the time-selective, frequency-selective and space-selective attributes of the multi-path space; and wherein the decoding step is based at least in part on a decomposition of essential degrees of the time-selective, frequency-selective and space-selective attributes of the multi-path space.

12. The method of claim 11, wherein:

the decoding step includes the step of executing a statistical multiresolution wavelet based procedure to decode the plurality of signals; and the procedure is based at least in part on a decomposition of essential degrees of the time-selective, frequency-selective and space-selective attributes of the multi-path space.

13. The method of claim 12, wherein:

the decoding step includes the step of executing a generalized likelihood detection procedure specially adapted for the time-selective, frequency-selective and space-selective attributes of the multi-path space; and the procedure is based at least in part on an efficient representation of the space-time multi-path response using wavelet-based signal decompositions.

14. The method of claim 13, wherein:

the decoding step includes the step of estimating the time-selective, frequency-selective and space-selective attributes of the multi-path response using a multiresolution signal subspace that approximates the multi-path space; and the subspace is focused using statistical information about the expected propagation environment.

15. An apparatus for communicating information from one location to another though a multi-path space having time-selective, frequency-selective and space-selective attributes using a multi-dimensional communication protocol comprising:

means for receiving a message at an input terminal corresponding to first information;

means for encoding a plurality of signals associated with the message;

means for transmitting the plurality of signals associated with the message;

means for receiving the plurality of signals associated with the message; and means for decoding the plurality of signals associated with the message to reconstruct the first information, wherein the means for decoding decodes the plurality of signals based at least in part on a decomposition of selected degrees of the time-selective, frequency-selective and space-selective attributes of the multi-path space using incomplete advance knowledge of the time-selective, frequency-selective and space-selective attributes of the multi-path space.

16. An apparatus for communicating information from one location to another through a wavefield space using a multi-dimensional communication protocol comprising:

a transmitter having a terminal configured to receive a message corresponding to first information and to encode a plurality of signals associated with the message;

a first plurality of antennas coupled to the transmitter and configured to transmit the plurality of signals associated with the message;

a second plurality of antennas configured to receive the plurality of signals associated with the message; and a receiver coupled to the second plurality of antennas and configured to decode the plurality of signals associated with the message to reconstruct the first information, wherein the receiver has no advance knowledge of at least one of the dimensions of the multi-dimensional protocol;

wherein the receiver is configured to execute a statistical procedure to identify and decode the plurality of signals;

wherein the receiver is configured to execute a generalized likelihood detection procedure to identify the plurality of signals and then execute a maximum likelihood detection procedure to decode the plurality of signals; and wherein the receiver is configured to estimate the wavefield space using a virtual wavefield space that approximates the wavefield space.

17. An apparatus for communicating information from one location to another though a multi-path wavefield space using a multi-dimensional communication protocol comprising:

a first transceiver having a terminal configured to receive a message corresponding to first information and to encode a plurality of signals associated with the message;

a first plurality of antennas coupled to the first transceiver and configured to transmit the plurality of signals associated with the message;

a second plurality of antennas configured to receive the plurality of signals associated with the message; and a second transceiver coupled to the second plurality of antennas and configured to decode the plurality of signals associated with the message to reconstruct the first information, wherein the second transceiver has no advance knowledge of at least one of the dimensions of the multi-dimensional protocol;

wherein the second transceiver is configured to execute a statistical procedure to identify and decode the plurality of signals;

wherein the second transceiver is configured to execute a generalized likelihood detection procedure to identify the plurality of signals and then execute a maximum likelihood detection procedure to decode the plurality of signals; and wherein the second transceiver is configured to estimate the wavefield space using a virtual wavefield space that approximates the wavefield space.

18. A method of communicating information from one location to another though a multi-path wavefield space using a multi-dimensional communication protocol comprising the steps of:

receiving a message at an input terminal corresponding to first information;

encoding a plurality of signals associated with the message using an encoder;

transmitting the plurality of signals associated with the message using a first plurality of antennas;

receiving the plurality of signals associated with the message using a second plurality of antennas; and decoding the plurality of signals associated with the message to reconstruct the first information using a receiver, wherein the decoding step uses no advance knowledge of at least one of the dimensions of the multi-dimensional protocol;

wherein the decoding step includes the step of executing a statistical procedure to identify and decode the plurality of signals;

wherein the decoding step includes the step of executing a generalized likelihood detection procedure to identify the plurality of signals and then executing a maximum likelihood detection procedure to decode the plurality of signals; and wherein the decoding step includes the step of estimating the wavefield space using a virtual wavefield space that approximates the wavefield space.

19. A method of decoding a plurality of received signals encoding a message, said plurality of received signals having been transmitted by a plurality of transmit antennas coupled to transmit a plurality of encoded input signals associated with said message at first locations though a multi-path space having dynamic time-selective, frequency-selective and space-selective attributes using a multi-dimensional communication protocol and received by a plurality of receive antennas at second locations, said method of decoding comprising:

decomposing essential degrees of the time-selective, frequency-selective and space-selective attributes of the multi-path space through which said plurality of received signals were received; and decoding said plurality of signals using incomplete advance knowledge of the time-selective, frequency-selective and space-selective attributes of the multi-path space.

20. The method of claim 19, further comprising executing a statistical multiresolution wavelet based procedure to decode the plurality of signals.

21. The method of claim 20, further comprising: executing a generalized likelihood detection procedure specially adapted for the time-selective, frequency-selective and space-selective attributes of the multi-path space; and basing the statistical multi-resolution wavelet based procedure at least in part on a representation of the space-time multi-path response using wavelet-based signal decompositions.

22. The method of claim 21, further comprising: estimating the time-selective, frequency-selective and space-selective attributes of the multi-path response using a multiresolution signal subspace that approximates the multi-path space; and wherein the subspace is focused using statistical information about the expected propagation environment.

* * * * *